US008446467B2

(12) United States Patent
Tilton et al.

(10) Patent No.: US 8,446,467 B2

(45) Date of Patent: May 21, 2013

(54) COMBINED SPEED DETECTION, VIDEO AND TIMING APPARATUS

(76) Inventors: Scott K. Tilton, Germantown, TN (US); William Clifford Robinson, Jr., Germantown, TN (US)

( * ) Notice: Subject to any disclaimer, the term of this patent is extended or adjusted under 35 U.S.C. 154(b) by 1384 days.

(21) Appl. No.: 11/743,970

(22) Filed: May 3, 2007

(65) Prior Publication Data

US 2007/0257814 A1 Nov. 8, 2007

Related U.S. Application Data

(60) Provisional application No. 60/746,572, filed on May 5, 2006.

(51) Int. Cl.
*H04N 7/18* (2006.01)

(52) U.S. Cl.
USPC ........... 348/143; 348/155; 348/157; 340/933; 340/936; 340/937; 342/104; 342/115; 702/142; 702/143

(58) Field of Classification Search
USPC ......... 340/901–905, 933, 936–938, 463–467; 348/155–159; 702/142–143; 701/117, 119; 382/104–107; 342/104, 115
See application file for complete search history.

(56) References Cited

U.S. PATENT DOCUMENTS

| | | | | | |
|---|---|---|---|---|---|
| 4,887,080 | A | * | 12/1989 | Gross | 340/937 |
| 5,408,330 | A | * | 4/1995 | Squicciarini et al. | 386/205 |
| 5,471,239 | A | * | 11/1995 | Hill et al. | 348/155 |
| 5,491,464 | A | * | 2/1996 | Carter et al. | 340/425.5 |
| 5,515,042 | A | * | 5/1996 | Nelson | 340/937 |
| 5,586,063 | A | * | 12/1996 | Hardin et al. | 702/142 |
| 5,677,979 | A | * | 10/1997 | Squicciarini et al. | 386/224 |
| 5,742,699 | A | * | 4/1998 | Adkins et al. | 382/107 |
| 5,898,400 | A | * | 4/1999 | Jones et al. | 342/104 |
| 5,935,190 | A | * | 8/1999 | Davis et al. | 701/119 |
| 5,938,717 | A | * | 8/1999 | Dunne et al. | 701/117 |
| 6,064,330 | A | * | 5/2000 | Elliott et al. | 342/54 |
| 6,091,355 | A | * | 7/2000 | Cadotte et al. | 342/104 |
| 6,124,805 | A | * | 9/2000 | Gabbard | 340/426.12 |
| 6,502,053 | B1 | * | 12/2002 | Hardin et al. | 702/143 |
| D470,785 | S | * | 2/2003 | Vermillion | D10/98 |
| 6,681,195 | B1 | * | 1/2004 | Poland et al. | 702/142 |
| 6,894,717 | B2 | * | 5/2005 | Bakewell | 348/149 |
| 6,999,896 | B2 | * | 2/2006 | Takahashi | 702/181 |
| 7,183,945 | B2 | * | 2/2007 | DiDomenico et al. | 340/937 |
| 7,874,928 | B2 | * | 1/2011 | Katayama | 473/198 |

(Continued)

FOREIGN PATENT DOCUMENTS

WO WO 99/40554 * 8/1999

*Primary Examiner* — Emmanuel L Moise
*Assistant Examiner* — Sarah Drabik
(74) *Attorney, Agent, or Firm* — Wayne Edward Ramage; Baker Donelson

(57) ABSTRACT

A combination speed-detection, video-recording, and timing device that can be hand-held. The device contains one or more speed detection means, including, but not limited to, a radar detection or laser detection device. The device includes a camera able to capture video in digital form, and a timing device, similar in function to a stopwatch. The device is pointed at the object whose speed is to be measured, or the events to be recorded, and can be operated by means of a trigger on a handle. The device may further include a display, along with display controls. Storage means is used to store the speed, video and timer data. The device may contain its own power supply, or may be externally powered.

19 Claims, 4 Drawing Sheets

U.S. PATENT DOCUMENTS 7,920,251 B2 * 4/2011 Chung ............................ 356/28
2002/0186148 A1 * 12/2002 Trajkovic et al. ............. 340/936
2003/0080878 A1 * 5/2003 Kirmuss ....................... 340/936
2005/0007451 A1 * 1/2005 Chiang ......................... 348/143
2006/0166757 A1 * 7/2006 Butler et al. .................. 473/334
2007/0124068 A1 * 5/2007 Nakayama et al. ........... 701/210

* cited by examiner

COMBINED SPEED DETECTION, VIDEO AND TIMING APPARATUS

This application claims priority to U.S. Provisional Patent Application No. 60/746,572, filed May 5, 2006, and is entitled in whole or in part to that filing date for priority. The complete specification, drawings, and disclosure of U.S. Provisional Patent Application No. 60/746,572 are incorporated herein in their entireties by reference.

TECHNICAL FIELD

The invention relates generally to speed-detection devices. More particularly, the invention relates to an apparatus that can capture the speed of a moving object while simultaneously recording a video of the object or events involving the object, and timing certain events involving the object.

BACKGROUND OF THE INVENTION

Various devices to detect the speed of moving objects, such as radar guns or laser speed detectors, are well-known. Such devices are used for a variety of purposes. A common use is by law enforcement agencies and personnel to monitor traffic and identify vehicles that are going faster than posted speed limits. It also has been increasingly common to capture images of said vehicles and use the images to enhance enforcement activities.

The design and operation of a speed detection system that uses a camera to capture still images may be found in Poland, et al., U.S. Pat. No. 6,681,195, entitled "Compact Speed Measurement System With Onsite Digital Image Capture, Processing, and Portable Display," which is incorporated herein by specific reference. Poland describes a multi-component system comprising a laser speed detector mounted on a tripod or in a bracket of a vehicle next to a digital camera, which takes digital images of the vehicle at the same time the speed is detected. The digital data is stored on a separate, portable field processor (e.g., a palmtop computer or personal digital assistant). However, the device is not easily held or used by a single individual, does not take a video of the vehicle, and requires a number of separate components.

Accordingly, what is needed is a light-weight, hand-held device that can be used to simultaneously record and store a video of an object while measuring its speed, further including a timer mechanism.

SUMMARY OF THE INVENTION

The present invention comprises a combination speed-detection and video-recording device. In one exemplary embodiment, the invention comprises a barrel with a handle. The handle may be permanently or removably attached to the barrel. The invention may be hand-held, or mounted on a tripod or fixed platform.

The device contains speed detection means, including but not limited to, a radar detection or laser detection device. In one exemplary embodiment, multiple speed detection means can be included together. Means for switching between the two devices can be provided, or said devices can be used simultaneously to provide two or more speed readings of the same object. A camera able to capture video of the object or an event in digital form also is included. In one exemplary embodiment, the invention further comprises a timing device, similar in function to a stopwatch that can be used for precise timing of events being recorded.

In operation, the front end of the barrel is pointed at the object whose speed is to be measured, or the events to be recorded, while the back end of the barrel contains a display, along with display controls (e.g., on/off buttons or switches, mode switch, and range control). The display area also may contain operation indicators or lights to indicate when particular modes or functions are in operation.

The display may be a monitor of any type known in the industry, including but not limited to an LCD or CRT monitor. The display can show a real time display of the video being captured by the camera. It can also report the speed of the object, the elapsed time (when in stopwatch mode), and/or real clock time. The speed and time data can be shown separately, but also may be shown as an overlay over the video. Real clock time data, in particular, may be particular helpful when the video is viewed or analyzed on a frame-by-frame basis.

Some controls may be located on the handle, such as the stop watch start/stop function and stop watch reset function. A toggle switch for zooming the video in and out may also be located on the handle. Some or all of these controls may be located on the back of the handle, as shown in FIG. 1, or on the side. In some embodiments, some or all of these controls, including the display controls, may be located on the barrel, the handle, or on a remote unit in wired or wireless communication with the device. In one exemplary embodiment, a detachable handle may function as a remote control unit.

One or more triggers may be located on the handle. When the trigger is pressed or triggered, the speed detection device records the instantaneous speed, and the video camera begins recording. Separate triggers may also be used for the speed detection and camera components. Alternatively, where a trigger has multiple control functions, the trigger may have certain positions, so that partial depression causes the video camera to begin recording, while full depression causes the recording of the speed, thus allowing video to be taken prior to the speed detection device being triggered. Time data also may be recorded along with the speed and/or video data.

Data, including speed data, time data, and camera image data (which may include video data and still image data), may be stored on storage means. Storage means may be a fixed hard drive, CD, or memory device inside the invention, and/or some form of removable memory device, such as a memory stick currently in use by digital cameras or a portable thumb or USB memory device that plugs into a USB port in the device. Communications ports, such as a USB jack, may be included in the device to allow data to be transferred to and from the device. Wireless communications, such as communications using Bluetooth technology, may also be used.

In one exemplary embodiment, the device also includes a power supply. Power can be supplied by one or more batteries, which may be located in the handle or elsewhere inside the device. The batteries may be removable, or fixed and rechargeable. One or more power connectors or plugs may also be provided, such as on the bottom of the handle, so that the device may be plugged into and powered by (or the battery recharged by) a normal AC receptacle, a cord plugged into a vehicle lighter, or the like.

DETAILED DESCRIPTION OF EXEMPLARY EMBODIMENTS

Figure 1:
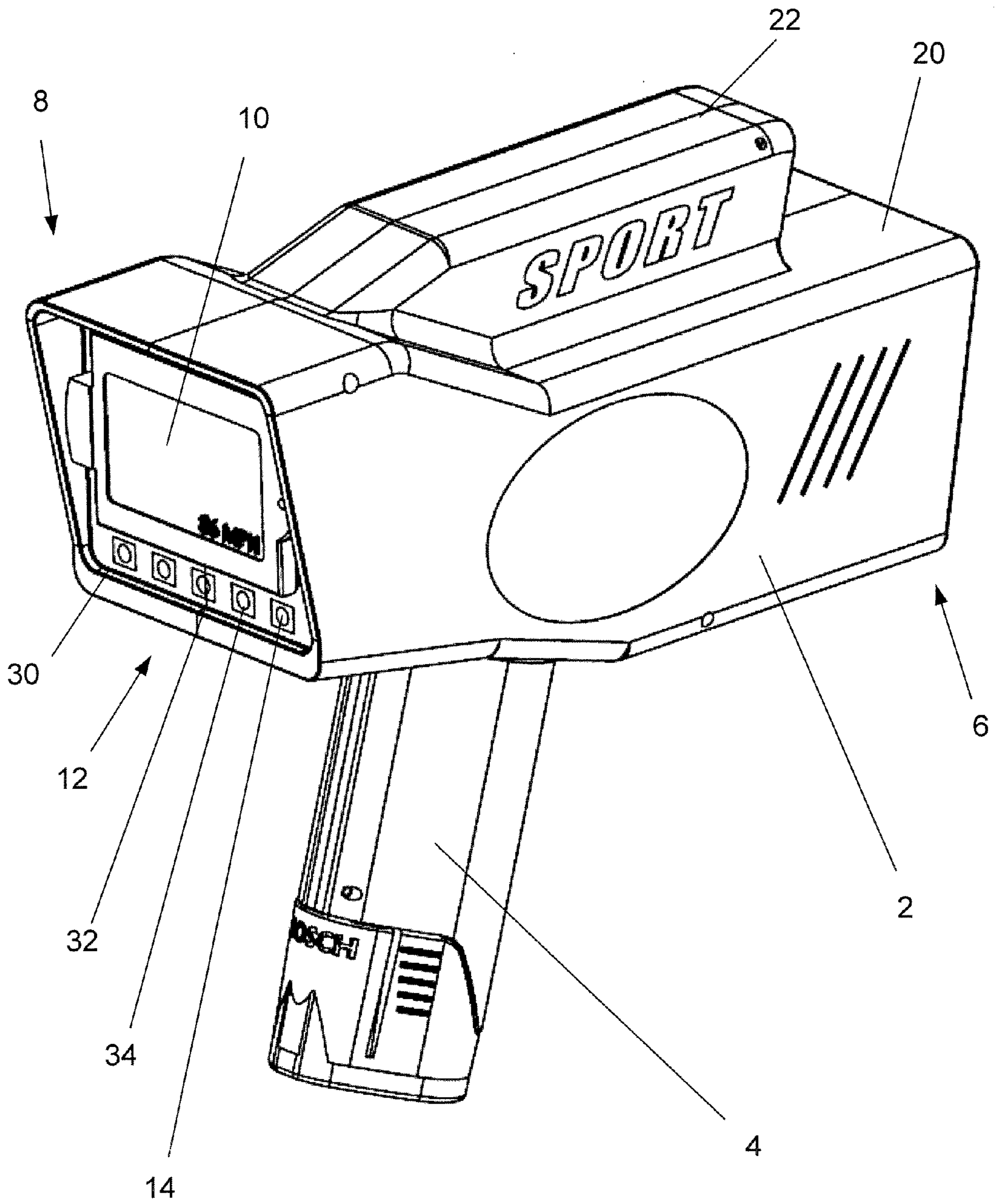
FIG. 1 shows a perspective view of a speed-detection device with a barrel and handle in accordance with one embodiment of the present invention.
Figure 2:
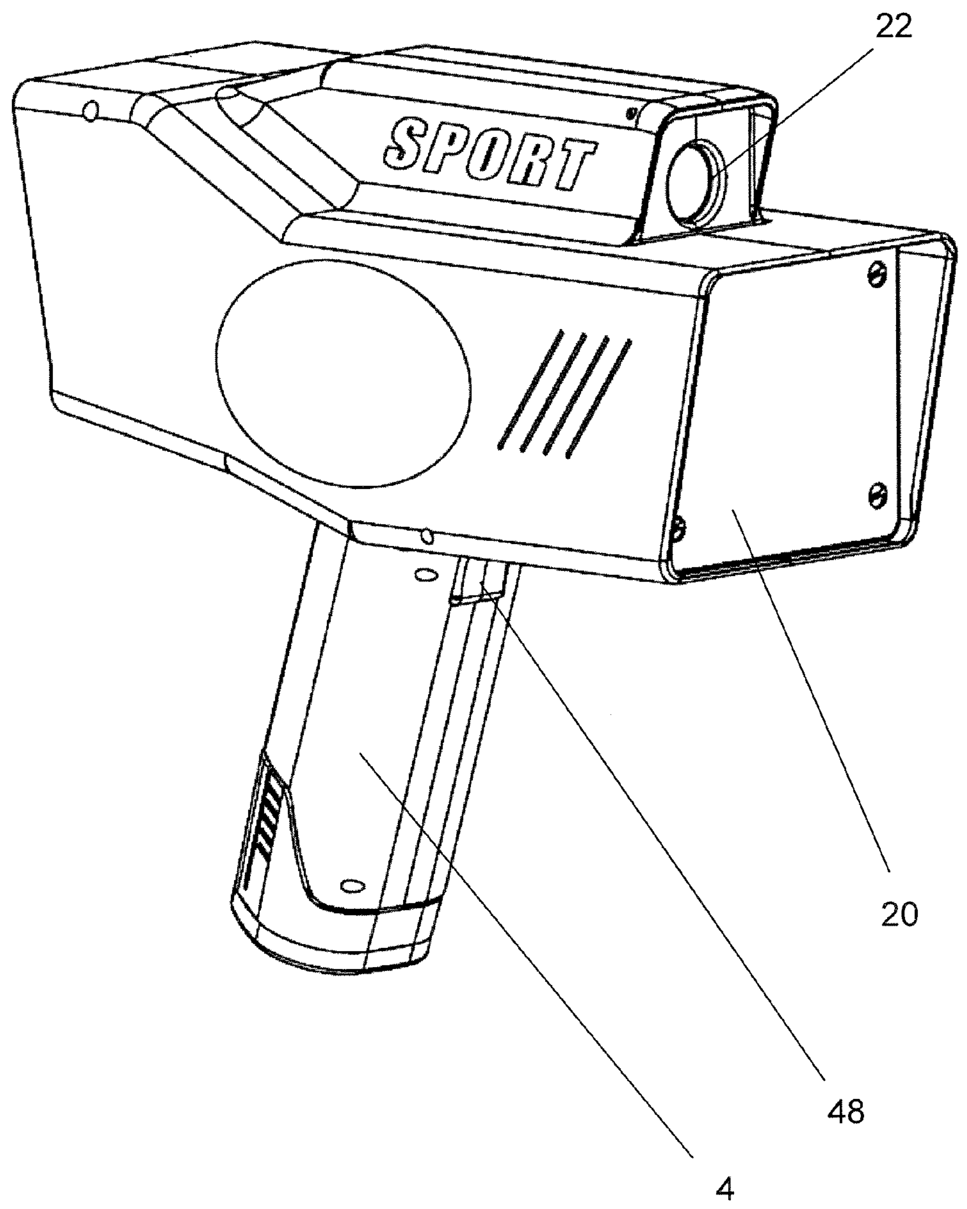
FIG. 2 shows another perspective view of the device of FIG. 1.
Figure 3:
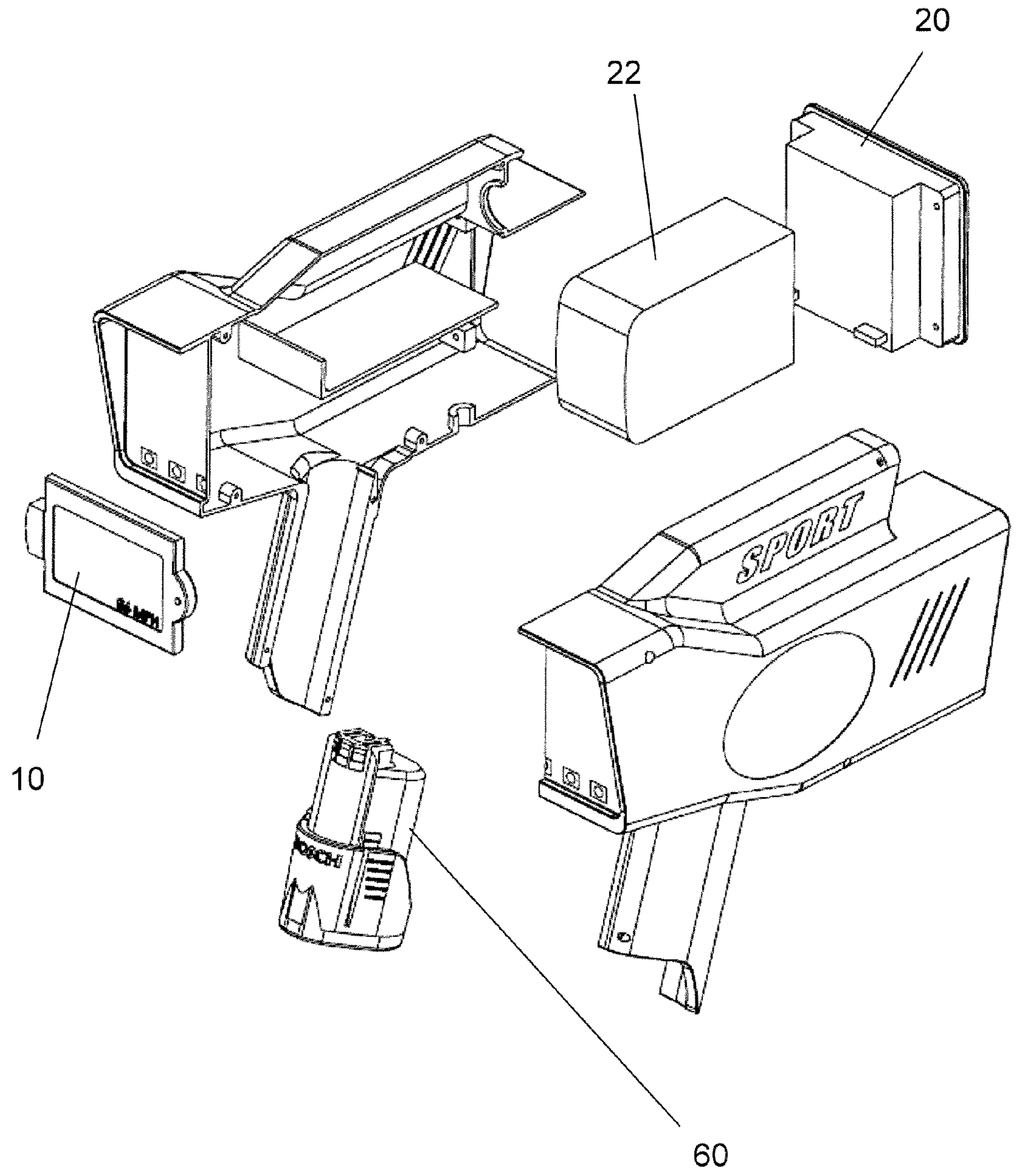
FIG. 3 shows an exploded view of the device of FIG. 1.
Figure 4:
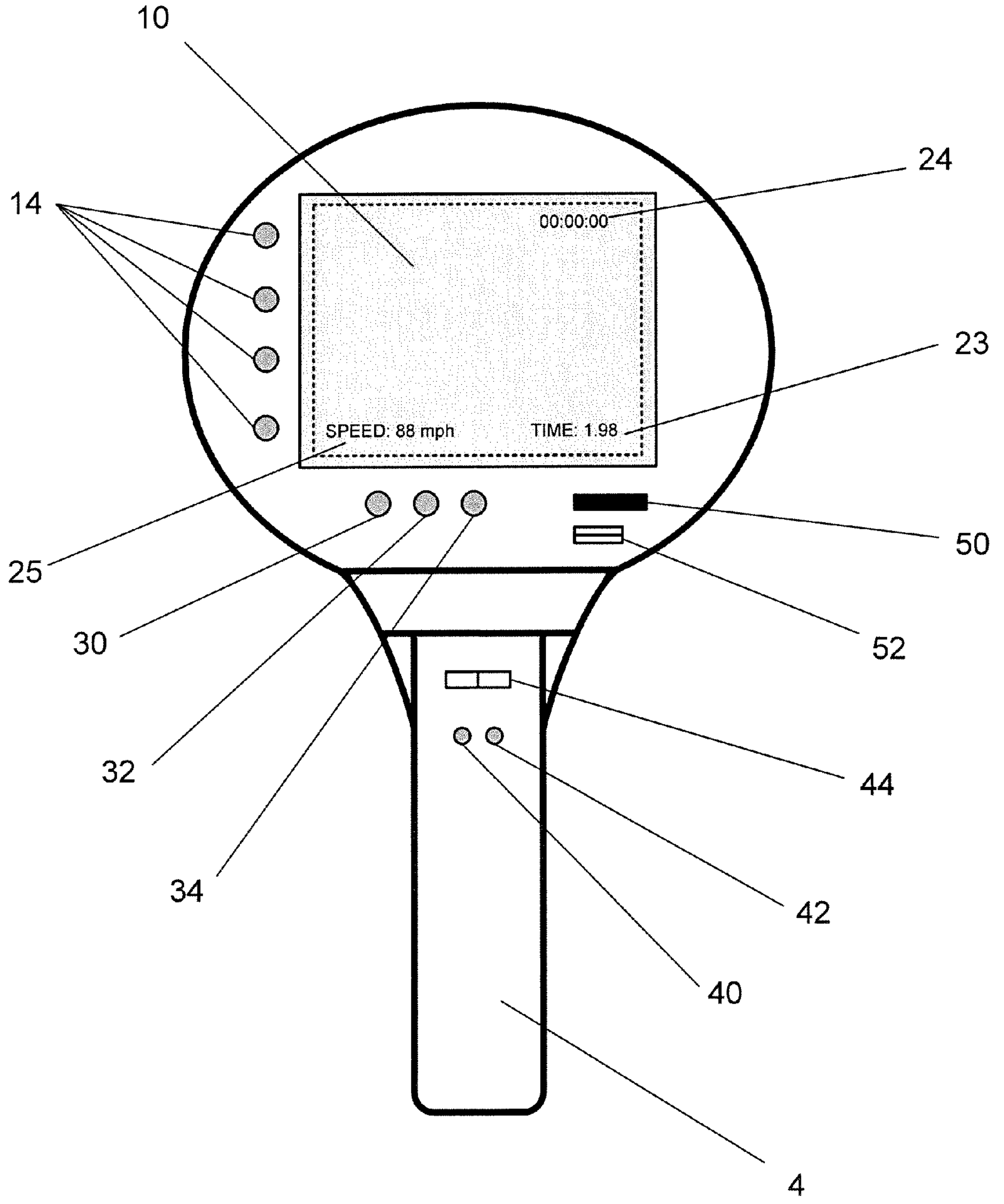
FIG. 4 shows a back view of a speed-detection device in accordance with another embodiment of the present invention.

As seen in FIGS. 1-3, in one exemplary embodiment the invention comprises a barrel 2 with a handle 4. The barrel 2 may be of any size or shape, but in one exemplary embodiment, as seen in FIG. 1, the invention is designed to be hand-held by the user, using either one hand or two hands. The handle 4 for two-handed use may be longer than the handle 4 for one-handed use. The handle may be a simple tube or polygon in shape, or may include areas shaped for the hand to grip.

In an alternative embodiment, the device may be mounted on a tripod or other fixed platform, such as the dashboard of a vehicle. In this latter configuration, the handle 4 may be detached, and the controls on the handle 4 placed elsewhere, such as on the barrel 2 or on a remote unit, which the handle itself may function as.

The front end 6 of the barrel 2 contains speed detection means 20, including, but not limited to, a radar detection or laser detection device. In one exemplary embodiment, multiple speed detection means 20 can be included together, and means for switching between the two devices can be provided, or said devices can be used simultaneously to provide two or more speed readings of the same object. A camera 22 able to capture video in digital form also is in, or on, the front of the barrel. The invention further comprises a timing device 24, similar in function to a stopwatch.

The front end 6 of the barrel 2 is pointed at the object whose speed is to be measured, or the events to be recorded, while the back end 8 of the barrel contains a display 10, along with display controls 12 (e.g., on/off buttons or switches 30, mode switch 32, or range control 34). The back end 8 also may contain operation indicators or lights 14 to indicate when particular modes or functions are in operation.

The display 10 can be a monitor of any type known in the industry, including but not limited to an LCD or CRT monitor. The display 10 can show a real time display of the video being captured by the camera 22. It can also report the speed of the object 25, the elapsed time (when in stopwatch mode) 24, and/or real clock time 23. The speed and time data can be shown separately, but also may be shown as an overlay over the video. Real clock time data 23, in particular, may be particular helpful when the video is viewed or analyzed on a frame-by-frame basis.

Some controls may be located on the handle 4, including the stop watch start/stop function 40 and stop watch reset function 42. A toggle switch for zooming the video in and out 44 may also be located on the handle. Some or all of these controls may be located on the back of the handle, as shown in FIGS. 1 and 3, or on the side. Also, some or all of these controls, including the display controls, may be located on the barrel, or on a remote unit in wired or wireless communication with the device.

One or more triggers 48 may be located on the handle. When the trigger 48 is pressed or triggered, the speed detection device records the instantaneous speed, and the video camera begins recording. Separate triggers may also be used. Alternatively, the trigger may have certain positions, so that partial depression causes the video camera to begin recording, while full depression causes the recording of the speed, thus allowing video to be taken prior to the speed detection device being triggered. Time data also may be recorded along with the speed and/or video data.

Data, including speed data, time data, and camera image data (which may include video data and still image data), may be stored on storage means 50. Storage means may be a fixed hard drive, CD, or memory device inside the invention, and/or some form of removable memory device, such as a memory stick 50 currently in use by digital cameras or a portable thumb or USB memory device that plugs into a USB port in the device. Communications ports, such as a USB jack 52, may be included in the device to allow data to be transferred to and from the device. Wireless communications, such as communications using Bluetooth technology, may also be used.

The device also includes a power supply. Power can be supplied by one or more batteries 60, which may be located in the handle or elsewhere inside the device. The batteries may be removable, or fixed and rechargeable. One or more power connectors or plugs may also be provided, such as on the bottom of the handle, so that the device may be plugged into and powered by (or the battery recharged by) a normal AC receptacle, cord plugged into a vehicle lighter, or the like.

The device may be used in a variety of settings. In the sports environment, such as baseball, football, or softball, the speed with which a ball is thrown can be directly measured and shown. The throwing event, as well as related events, such as a catcher catching a pitch and throwing the ball to second plate, can be recorded on video, and timed, either as a discrete event using the stop watch function and mode, or by analyzing the real time data associated with relevant frames of the video. Scouting and recruiting will become more efficient when providing more accurate and detailed information on athletes and their performances.

Similarly, the device may be used by law enforcement to detect speeding offenders with more detailed documentation and information than is now available in a single hand-held device. Offenders would have a more difficult time contesting speeding violations because actual real-time video data would be recorded, along with speed data. Speed data could include not only the radar or laser readings, but also the speed calculated based on the real time data associated with relevant frames of the video (e.g., the time it takes for the vehicle in the video to move between two objects or marks a known distance apart). Jurisdictions around the country could recognize a considerable increase in revenues with less court time.

In one exemplary embodiment, the device casing may be waterproof or water-resistant, and thus suitable for all-weather use. In another exemplary embodiment, some or all of the data can be saved in a protected or encrypted format, so the video and/or speed data cannot be subsequently altered or modified (or such alterations or modifications could be easily detected).

Thus, it should be understood that the embodiments and examples have been chosen and described in order to best illustrate the principles of the invention and its practical applications to thereby enable one of ordinary skill in the art to best utilize the invention in various embodiments and with various modifications as are suited for the particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

We claim:

1. A speed-detection, video-imaging apparatus, comprising:

a barrel with a front and back, wherein the front of the barrel is pointed at an object traveling at a speed;

a first speed-detection assembly mounted in or on said barrel, wherein said first speed-detection assembly is adapted to measure the speed of the object;

a first video-camera assembly mounted in or on said barrel, wherein said first video-camera assembly is adapted to record video images of the object whose speed is being measured;

a control or controls for operating said first speed-detection assembly and said first video-camera assembly;

a first stop-watch timer disposed in or on said barrel, with stop-watch start, stop and reset functions operable through stop-watch controls, wherein said stop-watch controls are separate from said first speed-detection assembly and first video-camera assembly controls, further wherein the stop-watch timer is adapted to display a stop-watch timing function and is not used to calculate or measure the speed of the object; and a display mounted in or on the back of said barrel to display video images, speed data from the first speed-detection assembly, or timer data from the first stop-watch timer, or a combination thereof.

2. The apparatus of claim 1, further comprising:

a handle attached to the barrel.

3. The apparatus of claim 2, wherein the handle is removably attached to the barrel.

4. The apparatus of claim 1, further comprising:

a second speed-detection assembly mounted in or on said barrel, wherein said second speed-detection assembly is adapted to measure the speed of the same object as the first speed-detection assembly.

5. The apparatus of claim 1, wherein the first speed-detection assembly is radar-based or laser-based.

6. The apparatus of claim 4, wherein the second speed-detection assembly is radar-based.

7. The apparatus of claim 4, wherein the second speed-detection assembly is laser-based.

8. The apparatus of claim 1, wherein the video images are digital in format.

9. The apparatus of claim 1, further comprising:

display controls located near or adjacent to the display.

10. The apparatus of claim 1, wherein said display comprises an LCD or CRT monitor.

11. The apparatus of claim 1, further comprising a data storage device, disc or drive.

12. The apparatus of claim 1, further comprising a power supply.

13. The apparatus of claim 2, further comprising a trigger on the handle, wherein said trigger is used to control the operation of both the first speed-detection assembly and the first video-camera assembly.

14. The apparatus of claim 2, wherein the apparatus is adapted to be hand-held.

15. The apparatus of claim 1, wherein one or more of said operational controls for the first speed-detection assembly, first video-camera assembly, or first stop-watch timer, or a combination thereof, are located on a remote control unit in wired or wireless communication therewith.

16. The apparatus of claim 2, further comprising a first trigger on the handle, said first trigger used to control the operation of the first speed-detection assembly, and a second trigger on the handle, said second trigger used to control the operation of the video-camera assembly.

17. The apparatus of claim 1, further comprising a USB port in the barrel.

18. The apparatus of claim 1, further comprising a Bluetooth communications device.

19. The apparatus of claim 1, wherein the video images or speed data, or both, are encrypted.

* * * * *